United States Patent
Li et al.

(10) Patent No.: US 11,050,471 B2
(45) Date of Patent: *Jun. 29, 2021

(54) ELECTRONIC APPARATUS AND RADIO COMMUNICATION METHOD IN RADIO COMMUNICATION SYSTEM

(71) Applicant: Sony Corporation, Tokyo (JP)

(72) Inventors: Gaosi Li, Beijing (CN); Jinhui Chen, Beijing (CN); Xin Zhang, Beijing (CN); Zaixue Wei, Beijing (CN); Nanxi Li, Beijing (CN)

(73) Assignee: SONY CORPORATION, Tokyo (JP)

( * ) Notice: Subject to any disclaimer, the term of this patent is extended or adjusted under 35 U.S.C. 154(b) by 39 days.

This patent is subject to a terminal disclaimer.

(21) Appl. No.: 16/538,829

(22) Filed: Aug. 13, 2019

(65) Prior Publication Data

US 2019/0363771 A1 Nov. 28, 2019

Related U.S. Application Data

(63) Continuation of application No. 15/560,853, filed as application No. PCT/CN2015/092838 on Oct. 26, 2015, now Pat. No. 10,432,277.

(30) Foreign Application Priority Data

Mar. 31, 2015 (CN) .......................... 201510147430.0

(51) Int. Cl.
  *H04B 7/06* (2006.01)
  *H04B 7/0456* (2017.01)
  *H04B 7/0413* (2017.01)

(52) U.S. Cl.
  CPC ......... *H04B 7/0617* (2013.01); *H04B 7/0413* (2013.01); *H04B 7/0469* (2013.01); *H04B 7/0626* (2013.01); *H04B 7/0639* (2013.01)

(58) Field of Classification Search
  CPC .. H04B 7/0617; H04B 7/0626; H04B 7/0639; H04B 7/0413; H04B 7/0469
  See application file for complete search history.

(56) References Cited

U.S. PATENT DOCUMENTS

| 8,068,511 B2 | 11/2011 | Reznik et al. |
| 2010/0014434 A1 | 1/2010 | Reznik et al. |

(Continued)

FOREIGN PATENT DOCUMENTS

| CN | 101888700 A | 11/2010 |
| CN | 102138361 A | 7/2011 |

(Continued)

OTHER PUBLICATIONS

Ericsson, "Baseline Performance", Feb. 9-13, 2015, 3GPP TSG-RAN WG1#80, R1-150766, pp. 1-8 (Year: 2015).*

(Continued)

*Primary Examiner* — Paul H Masur
(74) *Attorney, Agent, or Firm* — Xsensus LLP

(57) ABSTRACT

An electronic apparatus and radio communication method in a radio communication system. The electronic apparatus includes: one or more processing circuits configured to execute the following operations: determining, based on an antenna array corresponding to the electronic apparatus, corresponding a transceiver unit (TXRU) configuration, wherein each TXRU is associated with one set of antenna units having a same polarization direction, the antenna array includes plural antenna units having M rows, N columns and P-dimensional polarization directions, and M, N and P are natural numbers; and adding antenna configuration information to a radio resource control (RRC) signaling to be use in a user equipment (UE) in the radio communication system, wherein the antenna configuration information is used to obtain a number of the TXRU in the antenna configuration.

19 Claims, 10 Drawing Sheets

(56) References Cited

U.S. PATENT DOCUMENTS

| | | |
|---|---|---|
| 2012/0026913 A1 | 2/2012 | Reznik et al. |
| 2015/0124736 A1 | 5/2015 | Ko et al. |
| 2015/0180557 A1 | 6/2015 | Kim et al. |
| 2015/0318908 A1 | 11/2015 | Ko et al. |
| 2016/0043791 A1 | 2/2016 | Nam |
| 2016/0050003 A1 | 2/2016 | Ko et al. |
| 2016/0050006 A1 | 2/2016 | Ko et al. |
| 2016/0065290 A1 | 3/2016 | Zhu et al. |
| 2016/0119097 A1 | 4/2016 | Nam et al. |
| 2016/0142117 A1 | 5/2016 | Rahman et al. |
| 2016/0157218 A1 | 6/2016 | Nam et al. |
| 2016/0183275 A1 | 6/2016 | Inoue et al. |
| 2016/0204842 A1 | 7/2016 | Song et al. |
| 2016/0248562 A1 | 8/2016 | Nam et al. |
| 2016/0269084 A1 | 9/2016 | Nam et al. |
| 2016/0277090 A1 | 9/2016 | Kim et al. |
| 2016/0277091 A1 | 9/2016 | Kim et al. |
| 2016/0337056 A1 | 11/2016 | Frenne et al. |
| 2017/0288758 A1 | 10/2017 | Kakishima et al. |
| 2017/0331535 A1 | 11/2017 | Wei et al. |
| 2018/0131420 A1* | 5/2018 | Faxer .................. H04B 7/0469 |

FOREIGN PATENT DOCUMENTS

| | | |
|---|---|---|
| WO | 2014/171658 A1 | 10/2014 |
| WO | 2015/019776 A1 | 2/2015 |

OTHER PUBLICATIONS

3GPP, "Study on Elevation Beamforming/Full-Dimension (FD) MIMO for LTE (Release 13)", Feb. 2015, 3GPP TR 36.897 V0.2.0, R1-150793, pp. 1-23 (Year: 2015).*

International Search Report dated Jan. 19, 2016, in PCT/CN2015/092838 filed Oct. 26, 2015.

Office Action dated Oct. 19, 2020, in corresponding Indian patent Application No. 201717030512, 7 pages.

* cited by examiner

| antenna array configuration $(M, N, P, M_{TXRU})$ | (8, 4, 2, 2) | (8, 4, 2, 4) | (8, 4, 2, 8) |
|---|---|---|---|
| schematic diagram of TXRU configuration in an antenna array (same polarization directions in each dashed box belong to same TXRU) | | | |

| CSI-RS 0 | CSI-RS 1 | CSI-RS 2 | CSI-RS 3 |
|---|---|---|---|
| CSI-RS 4 | CSI-RS 5 | CSI-RS 6 | CSI-RS 7 |

Figure 9

ELECTRONIC APPARATUS AND RADIO COMMUNICATION METHOD IN RADIO COMMUNICATION SYSTEM

CROSS-REFERENCE TO RELATED APPLICATIONS

This application is a continuation of U.S. application Ser. No. 15/560,853, filed Sep. 22, 2017, which is based on PCT filing PCT/CN2015/092838, filed Oct. 26, 2015, and claims priority to CN 201510147430.0, filed Mar. 31, 2015, the entire contents of each are incorporated herein by reference.

TECHNICAL FIELD

The present disclosure relates to the technical field of wireless communication, and in particular to an electronic device in a wireless communication system and a method for performing wireless communication in a wireless communication system.

BACKGROUND

This section provides background information related to the present disclosure, which is not necessarily the conventional art.

With development of communication technology, research on vertical beamforming/FD MIMO (Full-Dimension Multiple-Input Multiple-Output) in LTE (Long Term Evolution) is started. The difference between the vertical beamforming/FD MIMO and the conventional transmission system lies in introducing a vertical dimension and using more antennas.

Moreover, with introduction of the vertical dimension, 2D antenna array is further proposed. Additionally, for convenience of description of large-scale antenna, a concept of TXRU (transceiver unit) is proposed correspondingly. TXRU is a radio transceiver unit with independent phase and amplitude.

There are multiple combinations of antenna arrays in 3D MIMO system. Moreover, the number of the TXRUs is variable, and a same number of TXRU corresponds different antenna configurations. Different antenna configurations result in different features of physical channels, in this case, the base station should select different codebooks to reflect the feature of the physical channels. In addition, different antenna configurations may affect a manner of transmitting a reference signal by a base station and a manner of a UE (User Equipment) measuring and feeding back the feature of a wireless channel. Hence, in order to improve transmission efficiency, it is necessary to notify the antenna configuration of the base station to the UE.

In a 3D MIMO system, an original notification unit for 1D antenna array information is no longer applicable since a 2D wireless array is used.

Hence, it is necessary to provide a new base-station-to-UE antenna configuration transmission design to serve for the 2D antenna array and the 3D MIMO system.

SUMMARY

This section provides a general summary of the present disclosure, rather than a full disclosure of full scope or all features of the present disclosure.

It is an object of the present disclosure to provide an electronic device in a wireless communication system and a method for performing wireless communication in a wireless communication system, so that a user equipment can obtain an antenna configuration of a base station, thereby the user equipment can conform to the configuration of the base station when estimating and measuring a channel, and transmission performance of the 3D MIMO system is improved.

According to an aspect of the present disclosure, an electronic device in a wireless communication system is provided. The electronic device includes one or more processing circuits configured to execute operations of determining a corresponding transceiver unit TXRU configuration based on an antenna array corresponding to the electronic device, where each TXRU is related to a group of antenna units having a same polarization direction, the antenna array includes multiple antenna units which are in M rows and N columns and have a P-dimension polarization direction, where M, N and P are natural numbers; and adding antenna configuration information into a Radio Resource Control RRC signaling for a user equipment in the wireless communication system, where the antenna configuration information is used to obtain the number of TXRUs in the antenna array.

According to another aspect of the present disclosure, an electronic device in a wireless communication system is provided. The electronic device includes one or more processing circuits configured to execute an operation of: extracting antenna configuration information from an RRC signaling from a base station in the wireless communication system, where the antenna configuration information is used to obtain the number of transceiver units TXRUs in an antenna array of the base station, where each TXRU is related to a group of antenna units having a same polarization direction, the antenna array includes multiple antenna units which are in M rows and N columns and have a P-dimension polarization direction, where M, N and P are natural numbers.

According to another aspect of the present disclosure, a method for performing wireless communication in a wireless communication system is provided. The method includes: determining a corresponding transceiver unit TXRU configuration based on an antenna array corresponding to an electronic device in the wireless communication system, where each TXRU is related to a group of antenna units having a same polarization direction, the antenna array includes multiple antenna units which are in M rows and N columns and have a P-dimension polarization direction, where M, N and P are natural numbers; and adding antenna configuration information into a Radio Resource Control RRC signaling for a user equipment in the wireless communication system, where the antenna configuration information is used to obtain the number of TXRUs in the antenna array.

According to another aspect of the present disclosure, a method for performing wireless communication in a wireless communication system is provided. The method includes: extracting antenna configuration information from an RRC signaling from a base station in the wireless communication system, where the antenna configuration information is used to obtain the number of transceiver units TXRUs in an antenna array of the base station, where each TXRU is related to a group of antenna units having a same polarization direction, the antenna array includes multiple antenna units which are in M rows and N columns and have a P-dimension polarization direction, where M, N and P are natural numbers.

With the electronic device in the wireless communication system and the method for performing wireless communication in the wireless communication system according to the present disclosure, the antenna configuration information may be transmitted via RRC signaling, and may be used to obtain the number of TXRUs in the antenna array. Accordingly, a user equipment can obtain an antenna configuration of a base station, thereby the user equipment can conform to the configuration of the base station when estimating and measuring a channel, and transmission performance of the 3D AMMO system is improved.

A further applicable scope will become apparent based on the description provided herein. The description and specific examples in the overview are only for schematic purposes and are not intended to limit the scope of the present disclosure.

BRIEF DESCRIPTION OF THE DRAWINGS

The drawings described herein are only for schematic purposes of the selected embodiments rather than all possible implementation, and are not intended to limit the scope of the present disclosure. In the drawings.

FIG. 9 is a schematic diagram illustrating an example of 8CSI-RS (channel state information reference signal) arranged in 2 rows and 4 columns;

Figure 1:
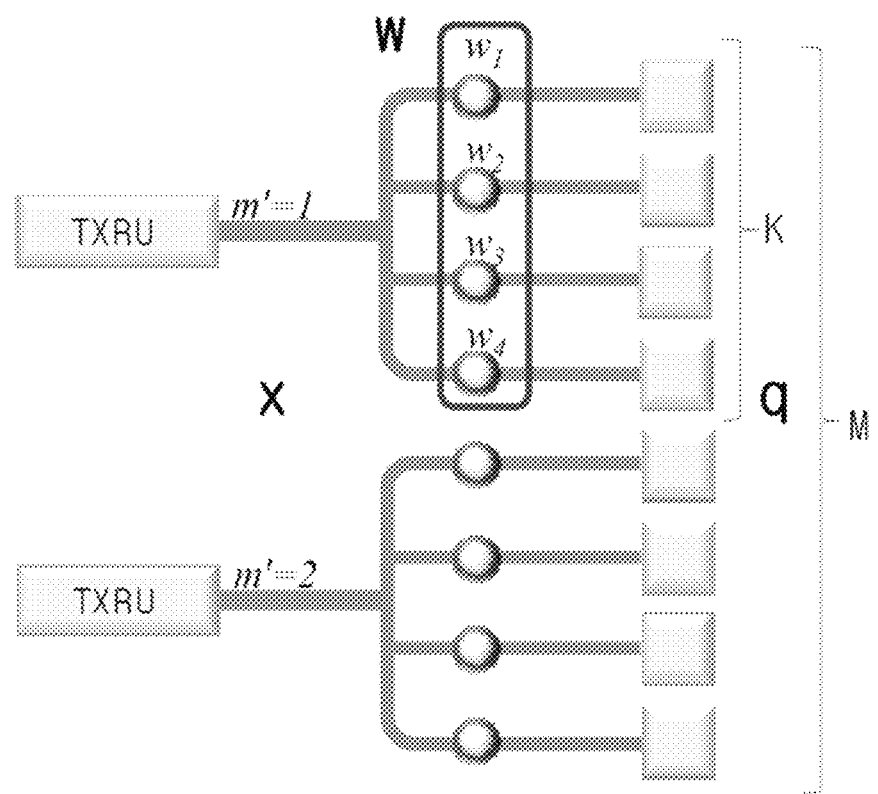
FIG. 1 is a schematic diagram illustrating an example of a relationship between a TXRU and an antenna.

While the present disclosure is susceptible to various modifications and alternative forms, specific embodiments thereof have been shown by way of example in the drawings and are herein described in detail. It should be understood, however, that the description herein of specific embodiments is not intended to limit the present disclosure to the particular forms disclosed, but on the contrary, the intention of the present disclosure is to cover all modifications, equivalents, and alternatives falling within the spirit and scope of the present disclosure. Note that corresponding reference numerals indicate corresponding parts throughout the several views of the drawings.

DETAILED DESCRIPTION OF THE EMBODIMENTS

Examples of the present disclosure will now be described more fully with reference to the accompanying drawings. The following description is merely exemplary in nature and is not intended to limit the present disclosure, application, or uses.

Example embodiments are provided so that this disclosure will be thorough, and will fully convey the scope to those skilled in the art. Numerous specific details are set forth such as examples of specific components, devices, and methods, to provide a thorough understanding of embodiments of the present disclosure. It will be apparent to those skilled in the art that specific details need not be employed, that example embodiments may be implemented in many different forms and that neither should be construed to limit the scope of the disclosure. In some example embodiments, well-known processes, well-known structures, and well-known technologies are not described in detail.

The UE (User Equipment) according to the present disclosure includes but not limited to a terminal having a wireless communication function such as a mobile terminal, a computer, a vehicle equipment and the like. Further, the UE according to the present disclosure may further be UE itself or a component therein such as a chip. In addition, the base station according to the present disclosure may be, for example, eNB volution Node Base Station) or a component in the eNB such as the chip.

Figure 2:
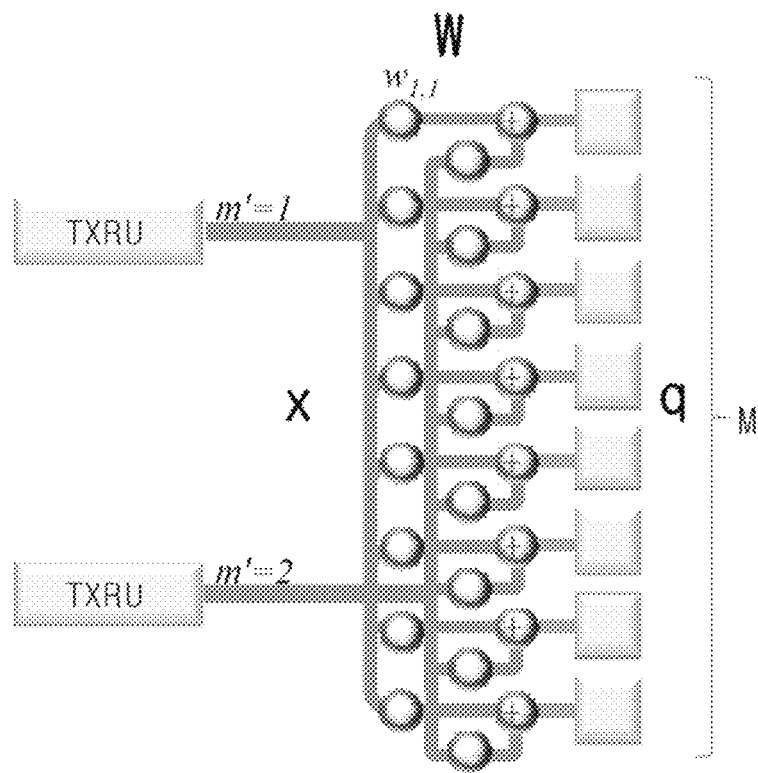
FIG. 2 is a schematic diagram illustrating another example of a relationship between a TXRU and an antenna.

TXRU (transceiver unit) is a radio transceiver unit with an independent phase and amplitude. FIG. 1 and FIG. 2 illustrate two examples of a relationship between a TXRU and an antenna. In FIG. 1 and FIG. 2, q is a Tx signal vector at M same polarization antenna units in one column, w and W are wideband TXRU virtual weight vector and matrix respectively, x is TXRU signal vector at $M_{TXRU}$ TXRUs. The parameter $M_{TXRU}$ indicates the number of TXRUs in each dimension of a polarization direction of each column in the antenna array.

Figure 3:
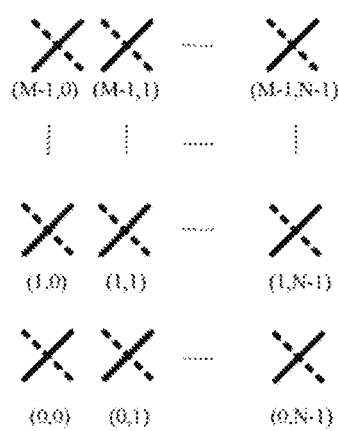
FIG. 3 is a schematic diagram illustrating 2D cross polarization antenna array.

In 2D antenna array, the number of antennas may be represented by (M, N, P), where M is the number of antennas having a same polarization direction in each column, N is the number of columns of the antenna array, and P is the number of dimension of antenna polarization direction. FIG. 3 illustrates cross-polarized 2D antenna array. As shown in FIG. 3. the antenna array includes multiple antenna units which are in M rows and N columns and have a two-dimension polarization direction. In the antenna unit as shown in FIG. 3, one polarization direction is represented by a solid line, and another polarization direction is represented by a dotted line.

In conjunction with a conception of TXRU, the number of antennas (M, N, P) may be converted into the number of TXRUs ($M_{TXRU}$, N, P). A value of $M_{TXRU}$ is agreed on in the field of wireless communication technology currently. Further, setting of TXRU is also agreed on in the field of wireless communication technology currently, as shown in Table 1.

TABLE 1

| antenna configuration structure | | |
|---|---|---|
| N = 1 | N = 2 | N = 4 |
| M = 8 | 4TXRU (1D) | 8TXRU (1D/2D) |
| | 8TXRU (2D) | 16TXRU (2D) |
| | | 32TXRU (2D) |
| | | 64TXRU (2D) |
| M = 4 | | 8TXRU (1D/2D) |
| | | 16TXRU (2D) |
| | | 32TXRU (2D) |

As can be seen from Table 1 that, there are multiple combinations of antenna arrays in 3D MIMO (3-Dimension Multiple-Input Multiple-Output) system. Moreover, the number of TXRUs may be changed from 4 to 64, and same number of TXRUs corresponds to different antenna configurations. Different antenna configurations result in different features of physical channels, in this case, the base station should select different codebooks to reflect the feature of the physical channels. In addition, different antenna configurations may affect a manner of transmitting a reference signal by a base station and a manner of a UE measuring and feeding back the feature of a wireless channel. Hence, in order to improve transmission efficiency, it is necessary to notify the antenna configuration of the base station to the UE. Hence, the disclosure proposes a new base-station-to-UE antenna configuration transmission design to serve for 2D antenna array and 3D MIMO system.

Figures 4, 5:
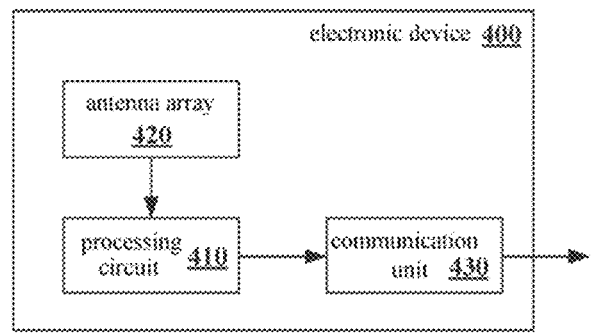
FIG. 4 is a block diagram illustrating a structure of an electronic device in a wireless communication system according to an embodiment of the present disclosure.
FIG. 5 is a schematic diagram illustrating an example of TXRU configuration in an antenna array.

FIG. 4 illustrates a structure of an electronic device 400 in a wireless communication system according to an embodiment of the present disclosure. As shown in FIG. 4, the electronic device 400 may include a processing circuit 410. It is to be noted that, the electronic device 400 may either include one processing circuit 410 or multiple processing circuits 410. Additionally, the electronic device 400 may further include an antenna array 420, a communication unit 430 and the like.

The processing circuit 410 may be configured to execute the operation of: determining a corresponding TXRU configuration based on an antenna array 420 corresponding to the electronic device 400. As mentioned above, each TXRU is related to a group of antenna units having a same polarization direction, the antenna array includes multiple antenna units which are in M rows and N columns and have a P-dimension polarization direction, where M, N and P are natural numbers.

It may be realized by those skilled in the art that, the processing circuit 410 may include various discrete functional units to perform a variety of different functions and/or operations. It is to be noted that these functional units may be physical entities or logical entities, and different units may be implemented by the same physical entity.

For example, the processing circuit 410 may include a determination unit (not shown in the drawings) which can determine a corresponding TXRU configuration based on the antenna array 420.

Further, processing circuit 410 may be configured to execute the operation of: adding antenna configuration information into a RRC (Radio Resource Control) signaling for a UE in the wireless communication system, where the antenna configuration information is used to obtain the number of the TXRUs in the antenna array 420. Correspondingly, the processing circuit 410 may include an adding unit (not shown in the drawings) for adding the antenna configuration information into the RRC signaling.

With the electronic device 400 according to an embodiment of the present disclosure, the antenna configuration information may be transmitted via the RRC signaling and used to obtain the number of the TXRUs in the antenna array 420. Since notification is performed via the RRC signaling, broadcast resource may be saved, and a UE supporting TXRU transmission is notified and unnecessary analysis of the conventional UE is reduced. Accordingly, effective transmission of TXRU configuration information is implemented.

FIG. 5 illustrates an example of TXRU configuration in an antenna array. As shown in FIG. 5, in antenna array configuration (8, 4, 2, 16), the antenna array includes multiple antenna units which are in 8 rows and 4 columns and have a two-dimension polarization direction, and includes 16 TXRUs. It is to be noted that, since same polarization directions in each dashed box belong to same TXRU and the antenna array has a two-dimension polarization direction, each dashed box corresponds to two TXRUs. Similarly, in antenna array configuration (8, 4, 2, 32), the antenna array includes multiple antenna units which are in 8 rows and 4 columns and have a two-dimension polarization direction, and includes 32 TXRUs. In antenna array configuration (8, 4, 2, 64), the antenna array includes multiple antenna units which are in 8 rows and 4 columns and have a two-dimension polarization direction, and includes 64 TXRUs.

As can be seen from FIG. 5, in 2D antenna array, the antenna arrays may have different numbers of TXRUs although antenna array configuration (M, N, P) are the same. Hence, effective transmission of TXRU configuration information is necessary.

According to a preferred embodiment of the present disclosure, the antenna configuration information may be used to obtain at least information on a parameter MTXRU to indicate the number of TXRUs in each dimension of a polarization direction of each column in the antenna array 420. In other words, the parameter $M_{TXRU}$ refers to the number of TXRUs in each dimension of a polarization direction of each column in the antenna array 420.

Figures 6, 7:
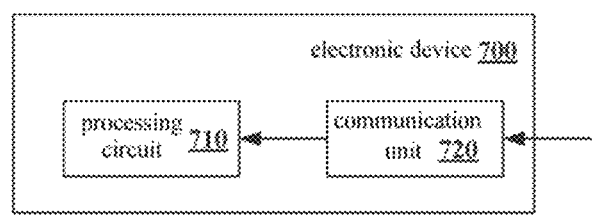
FIG. 6 is a schematic diagram illustrating another example of TXRU configuration in an antenna array.
FIG. 7 is a block diagram illustrating a structure of an electronic device in a wireless communication system according to an embodiment of the present disclosure.

FIG. 6 illustrates another example of TXRU configuration in an antenna array. As shown in FIG. 6, in antenna array configuration (8, 4, 2, 2), the antenna array includes multiple antenna units which are in 8 rows and 4 columns and have a two-dimension polarization direction, and the number of TXRUs in each dimension of a polarization direction of each column in the antenna array is 2. It is to be noted that, since same polarization directions in each dashed box belong to same TXRU and the antenna array has a two-dimension polarization direction, each dashed box corresponds to two TXRUs. Similarly, in antenna array configuration (8, 4, 2, 4), the antenna array includes multiple antenna units which are in 8 rows and 4 columns and have a two-dimension polarization direction, and the number of TXRUs in each dimension of a polarization direction of each column in the antenna array is 4. In antenna array configuration (8, 4, 2, 8), the antenna array includes multiple antenna units which are in 8 rows and 4 columns and have a two-dimension polarization direction, and the number of TXRUs in each dimension of a polarization direction of each column in the antenna array is 8.

It is to be noted that, indications of the parameters $M_{TXRU}$, M, N and P of antenna array configuration may have various sequences so long as the sequence is uniform in advance on both sending and receiving end. A sequence of the parameters in an example of FIG. 6 is (M, N, P, $M_{TXRU}$, and a parameter sequence ($M_{TXRU}$, M, N, P) is taken as an example in subsequent description.

According to a preferred embodiment of the present disclosure, a numerical range of the parameter $M_{TXRU}$ may information unit. A process and a structure of the antenna notification information unit are as follows.

```
-- ASN1START
AntennaInfoCommon ::=              SEQUENCE {
    antennaPortsCount                  ENUMERATED {an1, an2, an4, spare1}
}
AntennaInfoDedicated ::=           SEQUENCE {
    transmissionMode                   ENUMERATED {
                                           tm1, tm2, tm3, tm4, tm5, tm6,
                                           tm7, tm8-v1320},
    codebookSubsetRestriction          CHOICE {
        n2TxAntenna-tm3                    BIT STRING (SIZE (2)),
        n4TxAntenna-tm3                    BIT STRING (SIZE (4)),
        n2TxAntenna-tm4                    BIT STRING (SIZE (6)),
        n4TxAntenna-tm4                    BIT STRING (SIZE (64)),
        n2TxAntenna-tm5                    BIT STRING (SIZE (4)),
        n4TxAntenna-tm5                    BIT STRING (SIZE (16)),
        n2TxAntenna-tm6                    BIT STRUNG (SIZE (4)),
        n4TxAntenna-tm6                    BIT STRING (SIZE (16))
    }      OPTIONAL,                                               -- Cond TM
    ue-TransmitAntennaSelection        CHOICE{
        release                            NULL,
        setup                              ENUMERATED {closedLoop, openLoop}
    }
}
AntennaInfoDedicated-v1320 ::=     SEQUENCE {
    codebookSubsetRestriction-v1320    CHOICE {
        n2TxAntenna-tm8-r9                 BIT STRING (SIZE (6)),
        n4TxAntenna-tm8-r9                 BIT STRING (SIZE (32))
    }      OPTIONAL                                                -- Cond TM8
}
AntennaInfoDedicated-r10 ::=       SEQUENCE {
    transmissionMode-r10               ENUMERATED {
                                           tm1, tm2, tm3, tm4, tm5, tm6, tm7, tm8-v1320,
                                           tm9-v1020, tm10-v1130, spare6, spare5, spare4,
                                           spare3, spare2, spare1},
    codebookSubsetRestriction-r10      BIT STRING     OPTIONAL,-- Cond TMX
    ue-TransmitAntennaSelection        CHOICE{
        release                            NULL,
        setup                              ENUMERATED {closedLoop, openLoop}
    }
}
AntennaInfoDedicated-v12xx ::=     SEQUENCE {
    alternativeCodebookEnabledFor4TX-r12  ENUMERATED {true} OPTIONAL--Cond TMY
}
-- ASN1STOP
``` at least include 1, 2, 4 and 8 and a value of the parameter $M_{TXRU}$ is less than or equal to a value of the parameter M. The numerical range of the parameter $M_{TXRU}$ and a relationship between the numerical range of the parameter $M_{TXRU}$ and the parameter M can be obtained based on the antenna configuration structure in Table 1.

According to a preferred embodiment of the present disclosure, the RRC signaling may contain information on the number of antenna ports usable for a 3D MIMO (3-Dimension Multiple-Input Multiple-Output)/FD MIMO (Full-Dimension Multiple-Input Multiple-Output) system to indicate the number of the TXRUs. Since the number of TXRUs is the same as the number of antenna ports, the information on the number of antenna ports may be used in the 3D MIMO/FD MIMO system to indicate the number of TXRUs in a case that the RRC signaling contains the information.

According to a preferred embodiment of the present disclosure, the antenna configuration information may explicitly or implicitly contain information on an antenna configuration parameter. Next, firstly, it is described in detail the case that the antenna configuration information explicitly contains information on an antenna configuration parameter.

It is known for the inventor that, as a part of radio resource control information, an antenna notification information unit (antennainfo information elements) is defined in the RRC It can be seen that, in above antenna notification information unit, contents being notified to a UE include the number of antenna ports, a transmission mode and a corresponding codebook subset restriction. The antenna notification information should be transmitted to the UE in a process that the UE performs random access since the antenna notification information unit is a part of radio resource control (RRC) information unit. The UE transmits RRC connection request signaling to a base station on a random access channel to establish RRC connection in the process that the UE performs random access. Then the base station transmits RRC connection establishment signaling to the UE on a forward access channel including the antenna notification information unit. Additionally, the codebook subset restriction may also be transmitted in CSI-Process information unit. In this case, the codebook subset restriction may still be transmitted in CSI process information unit. Moreover, in order to keep integrity of current antenna notification information unit, it is hoped that only antenna communication information is added without changing existing information unit.

According to a preferred embodiment of the present disclosure, the antenna configuration parameter in the antenna configuration information may include one or more of: the parameter $M_{TXRU}$, a parameter M, a parameter N, a parameter P and a combination thereof. Preferably, the antenna configuration parameter may include the parameter $M_{TXRU}$, the parameter M, the parameter N and the parameter P.

Additionally, according to a preferred embodiment of the present disclosure, the processing circuit 410 (for example, the adding unit included in the processing circuit 410) may add the antenna configuration information into an antenna notification information unit or a CSI-RS (channel state information reference signal) configuration information unit in the RRC signaling.

Specifically, for example, a unit called antennaNumber-Count may be added into AntennaInfoDedicated-r13. The unit contains four parameters ($M_{TXRU}$, M, N, P). To meet antenna configuration in Table 1, M may be equal to 4 or 8, N may be equal to 1, 2 or 4, P may be equal to 1 or 2, and a corresponding $M_{TXRU}$ may be obtained form Table 1. Since the part is new-added content, the unit should occur after conventional content, the changed antenna notification information unit is as follows.

```
... ...
AntennaInfoDedicated-r13 ::=        SEQUENCE {
   antennaNumberCountM              ENUMERATED {an4,an8}
   antennaNumberCountN              ENUMERATED {an1,an2,an4}
   antennaNumberCountP              ENUMERATED {an1,an2}
   antennaNumberConutMTXRU          {TXRU1,TXRU2,TXRU4,TXRU8}
   ENUMERATED
}
```

An actual value of the antenna configuration parameter a function of the actual value may be represented by a predetermined bit number when the base station notifies the parameters to the UE. For example, the antenna parameters are indicated by 1 bit or 2 bits, or the actual values of the antenna parameters are transmitted. Further, the base station may also transmit the parameters in form of $\log_2$ ($M_{TXRU}$, M, N, P) since the antenna parameters are in form of exponential of 2.

Moreover, for the parameter sequence ($M_{TXRU}$, M, N, P), the base station may use a parameter $M/M_{TXRU}$ to replace the parameter $M_{TXRU}$ or M. In this case, the parameter may be transmitted separately in a case that the parameter $M/M_{TXRU}$ is constant in a system, thereby system overhead is reduced. Moreover, in a case that the number of antennas in a TXRU is constant, the UE can obtain the total number of antennas in the system based on the number of TXRUs, thus only two parameters are required to be transmitted in the parameter sequence (M, N, P).

Another method for obtaining the number of TXRUs is defining a new part called CSI-RS-Config-r13 in CSI-RS-Config information unit, and the part includes antennaPorts-Count-r13. The number of TXRUs can be obtained from the new part since the number of TXRUs is equal to the number of antenna ports. The changed CSI-RS-Config information unit is as follows.

```
CSI-RS-Config-r10 ::=    SEQUENCE {
... ...
CSI-RS-Config2-r12 ::=   SEQUENCE {
... ...
CSI-RS-Config-r13 ::=    SEQUENCE {
   csi-RS-r13                CHOICH {
      release                   NULL,
      setup                     SEQUENCE {
```

```
         antennaPortsCount-r13    ENUMERATED {an4, an8,
                                              an16, an32,
                                              an64, spare3,
                                              spare2,
                                              spare1},
   ... ...
   }
}
   zeroTxPowerCSI-RS-r13         CHOICH{
   ... ...
}
```

The user can obtain the number of the TXRUs based on antennaPortsCount-r13. Accordingly, in the scheme, the parameter sequence ($M_{TXRU}$, M, N, P) may be simplified into (M, N, P), and the antenna parameter may be obtained after knowing the number of the TXRUs. Moreover, the parameter sequence (M, N, P) may also be explicitly transmitted in CSI-RS-Config-r13.

Next, it is described in detail the case that the antenna configuration information implicitly contains information on an antenna configuration parameter.

According to a preferred embodiment of the present disclosure, the processing circuit 410 (for example, the adding unit included in the processing unit 410) may add the antenna configuration information by using a codebook subset restriction in the RRC signaling. More preferably, the processing circuit 410 (for example, the adding unit included in the processing unit 410) may express the antenna configuration information by adding a predetermined bit number into a bit string for selecting a codebook in the codebook subset restriction. Alternatively, the processing circuit 410 (for example, the adding unit included in the processing unit 410) may express the antenna configuration information by adding a codebook index into the codebook subset restriction.

Specifically, a new transmission mode is provided in the present disclosure and different antenna configurations are distinguished based on the codebook subset restriction. Firstly, it is provided a new transmission mode for vertical beamforming/FD MIMO system. The new transmission mode defines a codebook subset restriction including information on the number of the antennas and the number of the TXRUs. In the conventional antenna notification information unit, it can be seen that, in codebookSubsetRestriction part, transmission conditions are distinguished based on the number of the antenna ports. Hence, in the new transmission mode, the transmission conditions can still be distinguished based on the number of the antenna ports. It can be said that the transmission conditions are distinguished based on the number of the TXRUs since the number of the antenna ports is equal to the number of the TXRUs. As can be seen from Table 1, the number of the TXRUs may be equal to 4, 8, 16, 32 or 64. Moreover, different antenna configuration states under the same number of TXRUs can be distinguished by adding several bits into a bit string for selecting a codebook. The changed antenna information transmission unit is as follows.

```
AntennaInfoDedicated-r10 ::=          SEQUENCE {
    transmissionMode-r10                  ENUMERATED {
                                              tm1, tm2, tm3, tm4, tm5, tm6, tm7, tm8-v1320,
                                              tm9-v1020, tm10-v1130, tm11-v13xx, spare5, spare4,
                                                  spare3, spare2, spare1},
    codebookSubsetRestriction-r10         BIT STRING      OPTIONAL, -- Cond TMX
    ue-TransmitAntennaSelection           CHOICE{
        release                               NULL,
        setup                                 ENUMERATED {closedLoop, openLoop}
    }
}
... ...
AntennaInfoDedicated-v13xx ::=        SEQUENCE {
    codebookSubsetRestriction-v13xx       CHOICE {
        n4TxAntenna-tm11-r13                    BIT STRING (SIZE (96)),
        n8TxAntenna-tm11-r13                    BIT STRING (SIZE (112)),
    n16TxAntenna-tm11-r13                       BIT STRING (SIZE (219)),
    n32TxAntenna-tm11-r13                       BIT STRING (SIZE (437)),
    n64TxAntenna-tm11-r13                       BIT STRING (SIZE (872)),
    }       OPTIONAL                                                              }
```

Several bits are added to front of the bit string to distinguish different antenna configurations since the same number of the TXRUs may correspond to different antenna configurations in Table 1. The UE should extract the added bit based on the number of the antenna ports and determine antenna configuration upon reception of the bit string. It is assumed that a length of a bit string is 96 in a case of 4 antenna ports. Moreover, in Table 1, the number of the added bits is 0 since there is only one antenna configuration in a case of 4 TXRUs. It is assumed that a length of a bit string is 109 in a case of 8 antenna ports. The number of the added bits is 3 since there are 5 antenna configurations for 8 TXRUs in Table 1. For cases of 16, 32 and 64 antenna ports, it is assumed that patterns of organization of bit mapping tables under these three cases are similar to a case of 8 antenna ports, only a scale of the bit mapping table is bigger. It can be seen from Table 1 that, the number of the added bits are 1, 1 and 0 for 16, 32 and 64 antenna ports respectively. Hence, the lengths of bit string corresponding to three cases should be 219, 437 and 872. A relationship between the added bits and the antenna configuration is as shown in Table 2.

TABLE 2 correspondence between the added bit and antenna configuration

| | added bit string | antenna configuration |
|---|---|---|
| 4 TXRU | — | (8, 2, 1) |
| 8 TXRU | 000 | (8, 2, 2) |
| | 001 | (8, 4, 1) |
| | 010 | (8, 4, 2) |
| | 011 | (4, 4, 1) |
| | 100 | (4, 4, 2) |
| 16 TXRU | 0 | (8, 4, 2) |
| | 1 | (4, 4, 2) |
| 32 TXRU | 0 | (8, 4, 2) |
| | 1 | (4, 4, 2) |
| 64 TXRU | — | (8, 4, 2) |

Another method for designing codebook subset restriction is firstly designing a codebook index for distinguishing antenna configurations, then selecting a corresponding code from a bit mapping table of the codebook subset restriction. The changed antenna notification information unit is as follows.

```
AntennaInfoDedicated-r10 ::=          SEQUENCE {
    transmissionMode-r10                  ENUMERATED {
                                              tm1, tm2, tm3, tm4, tm5, tm6, tm7, tm8-v1320,
                                              tm9-v1020, tm10-v1130, tm11-v13xx, spare5, spare4,spare3,
                                              spare2, spare1},
    codebookSubsetRestriction-r10         BIT STRING      OPTIONAL, -- Cond TMX
    ue-TransmitAntennaSelection           CHOICE{
        release                               NULL,
        setup                                 ENUMERATED {closedLoop, openLoop}
    }
}
... ...
AntennaInfoDedicated-v13xx ::=        SEQUENCE {
    codebookSelectionIndex                ENUMERATED{index1, index2, index3, index4,
                                              index5, index6, spare2, spare1},
    codebookSubsetRestriction-v13xx       CHOICE {
        n4TxAntenna-tm11-r13                    BIT STRING (SIZE (96)),
        n8TxAntenna-tm11-r13                    BIT STRING (SIZE (109)),
    n16TxAntenna-tm11-r13                       BIT STRING (SIZE (218)),
    n32TxAntenna-tm11-r13                       BIT STRING (SIZE (436)),
    n64TxAntenna-tm11-r13                       BIT STRING (SIZE (872)),
    }       OPTIONAL                                                              }
```

In the design, the codebook subset restriction is used to select code rather than distinguishing antenna configurations, hence, the part of adding bit in previous design is no longer needed. In Table 1, there are 6 types of different antenna configurations regardless of the number of TXRUs, hence, there are 6 indexes in codebook selection. A correspondence between the codebook selection index and the antenna configuration is as shown in Table 3.

TABLE 3 correspondence between codebook selection index and antenna configuration

| codebook selection index | antenna configuration |
|---|---|
| 000 | (8, 2, 1) |
| 001 | (8, 2, 2) |
| 010 | (8, 4, 1) |
| 011 | (8, 4, 2) |
| 100 | (4, 4, 1) |
| 101 | (4, 4, 2) |

As described above, selection of antenna configuration and CSI-RS transmission mechanism are different in two schemes. In a first scheme, the parameter sequence ($M_{TXRU}$, M, N, P) can be obtained directly, the antenna configuration is (M, N, P). Moreover, a total number of the TXRUs is known as ($M_{TXRU} \times N \times P$) based on the parameters $M_{TXRU}$ and N, hence, the number of CSI-R,Ss is ($M_{TXRU} \times N \times P$), The CSI-RSs are distributed in $M_{TXRU}$ rows and N columns and a P-dimension polarization direction. However, in a second scheme, the number of the TXRUs may be obtained based on the codebook subset restriction. The antenna configuration may be obtained from Table 2 or Table 3. The number of CSI-RSs NCSI-RS (that is equal to the number of the TXRUs) and distribution of CSI-RSs may be determined based on the total number of the TXRUs and the antenna configuration (M, N, P). FIG. 9 is an example of 8CSI-RS distributed in 2 rows and 4 columns, which is used for 2D antenna array with the antenna parameters (1, 8, 4, 2), (2, 8, 4, 1), (1, 4, 4, 2) and (2, 4, 4, 1).

It is to be noted that, according to an embodiment of the present disclosure, the wireless communication system as described above may be a LTE-A (Long Term Evolution-Advanced) cellular communication system, the electronic device 400 may be a base station in the wireless communication system, and the electronic device 400 may further include an antenna array 420, a communication unit 430 and the like. For example, the communication unit 430 may transmit RRC signaling to a UE in the wireless communication system.

The electronic device on a base-station side in the wireless communication system is described as above. Next, an electronic device on a UE side in the wireless communication system is described in detail. FIG. 7 illustrates a structure of an electronic device 700 in a wireless communication system according to an embodiment of the present disclosure.

As shown in FIG. 7, the electronic device 700 may include a processing circuit 710. It is to be noted that, the electronic device 700 may either include one processing circuit 710 or multiple processing circuits 710. Additionally, the electronic device 700 may further include a communication unit 720 and the like.

The processing circuit 710 may extract antenna configuration information from an RRC signaling from a base station in the wireless communication system.

As mentioned above, similarly, the processing circuit 710 may also include various discrete functional units to perform a variety of different functions and/or operations. These functional units may be physical entities or logical entities, and different units may be implemented by the same physical entity.

For example, the processing circuit 710 may include an extraction unit (not shown in the drawings) which may extract antenna configuration information from an RRC signaling from a base station in the wireless communication system.

As mentioned above, the antenna configuration information may be used to obtain the number of TXRUs in an antenna array of the base station. Similarly, each TXRU is related to a group of antenna units having a same polarization direction, the antenna array includes multiple antenna units which are in M rows and N columns and have a P-dimension polarization direction, where M, N and P are natural numbers.

Preferably, the antenna configuration information may be used to obtain at least information on a parameter MTXRU to indicate the number of TXRUs in each dimension of a polarization direction of each column in the antenna array.

Preferably, a numerical range of the parameter $M_{TXRU}$ at least includes 1, 2, 4 and 8 and a value of the parameter $M_{TXRU}$ is less than or equal to a value of a parameter M.

Preferably, the processing circuit 710 (for example, an extraction unit included in the processing circuit 710) may further extract, from the RRC signaling, information on the number of antenna ports usable for a 3D MIMO/FD AMMO system to determine the number of the TXRUs.

Preferably, the antenna configuration parameter may include the parameter $M_{TXRU}$, a parameter M, a parameter N and a parameter P.

Preferably, the processing circuit 710 may decode at least one of an antenna notification information unit, a CSI-RS configuration information unit and a codebook subset restriction information unit in the RRC signaling to obtain the antenna configuration information. Correspondingly, the processing circuit 710 may include a parsing unit (not shown in the drawings) which can execute the preceding parsing operation.

Preferably, the processing circuit 710 may select at least one of a CSI (channel state information) feedback cod book and a CSI feedback scheme based on the antenna configuration information. More preferably, the processing circuit 710 may select both of a CSI feedback codebook and a CSI feedback based on the antenna configuration information. Correspondingly, the processing circuit 710 may include a selection unit (not shown in the drawings) which can execute the preceding selection operation.

It is to be noted that, according to an embodiment of the present disclosure, the wireless communication system as described above may be a LTE-A cellular communication system, the electronic device 700 may be a UE in the wireless communication system, and the electronic device 700 may further include a receiver (for example, the communication unit 720) to receive the RRC signaling.

The electronic device in the wireless communication system according to an embodiment of the present disclosure is described as above. Next, a method for performing wireless communication in a wireless communication system according to an embodiment of the present disclosure is described in detail.

The method for performing wireless communication in a wireless communication system according to an embodiment of the present disclosure may include: determining a corresponding TXRU configuration based on an antenna array corresponding to an electronic device in the wireless communication system, where each TXRU is related to a group of antenna units having a same polarization direction, the antenna array includes multiple antenna units which are in M rows and N columns and have a P-dimension polarization direction, where M, N and P are natural numbers.

The method may further include adding antenna configuration information into a RRC signaling for a user equipment in the wireless communication system, where the antenna configuration information is used to obtain the number of TXRUs in the antenna array.

Preferably, the antenna configuration information may be used to obtain at least information on a parameter $M_{TXRU}$ to indicate the number of TXRUs in each dimension of a polarization direction of each column in the antenna array.

Preferably, a numerical range of the parameter $M_{TXRU}$ at least includes 1, 2, 4 and 8 and a value of the parameter $M_{TXRU}$ is less than or equal to a value of a parameter M.

Preferably, the RRC signaling may contain information on the number of antenna ports usable for a 3D MIMO/FD MIMO system to indicate the number of the TXRUs.

Preferably, the antenna configuration information may explicitly contain information on an antenna configuration parameter.

Preferably, the antenna configuration parameter may include one or more of: the parameter $M_{TXRU}$, a parameter M, a parameter N, a parameter P and a combination thereof. More preferably, the antenna configuration parameter may include the parameter $M_{TXRU}$, the parameter M, the parameter N and the parameter P.

Preferably, the antenna configuration information may be added into an antenna notification information unit or a CSI-RS configuration information unit in the RRC signaling.

Preferably, an actual value of the antenna configuration parameter or a function of the actual value may be represented by a predetermined bit number.

Preferably, the antenna configuration information may implicitly contain information on an antenna configuration parameter.

Preferably, the antenna configuration information may be added by using a codebook subset restriction in the RRC signaling.

Preferably, the antenna configuration information may be expressed by adding a predetermined bit number into a bit string for selecting a codebook in the codebook subset restriction.

Preferably, the antenna configuration information may be expressed by adding a codebook index into the codebook subset restriction.

In another aspect, a method for performing wireless communication in a wireless communication system according to an embodiment of the present disclosure may include: extracting antenna configuration information from an RRC signaling from a base station in the wireless communication system.

As mentioned above, the antenna configuration information may be used to obtain the number of transceiver units TXRUs in an antenna array of the base station, where each TXRU is related to a group of antenna units having a same polarization direction, the antenna array includes multiple antenna units which are in 114 rows and N columns and have a P-dimension polarization direction, where M, N and P are natural numbers.

Preferably, the antenna configuration information may be used to obtain at least information on a parameter $M_{TXRU}$ to indicate the number of TXRUs in each dimension of a polarization direction of each column in the antenna array.

Preferably, a numerical range of the parameter $M_{TXRU}$ at least includes 1, 2, 4 and 8 and a value of the parameter $M_{TXRU}$ is less than or equal to a value of a parameter M.

Preferably, information on the number of antenna ports usable for a 3D MIMO/FD MIMO system may further be extracted from the RRC signaling, to determine the number of the TXRUs.

Preferably, the antenna configuration parameter may include the parameter $M_{TXRU}$, a parameter M, a parameter N and a parameter P.

Preferably, at least one of an antenna notification information unit, a CSI-RS configuration information unit and a codebook subset restriction information unit in the RRC signaling may be decoded to obtain the antenna configuration information.

Preferably, at least one of a CSI feedback codebook and a CSI feedback scheme may be selected based on the antenna configuration information. More preferably, both a CSI feedback codebook and a CSI feedback may be selected based on the antenna configuration information.

Various specific embodiments of the above steps of a method for performing wireless communication in a wireless communication system is described in detail as above, which is not described here.

Figure 8:
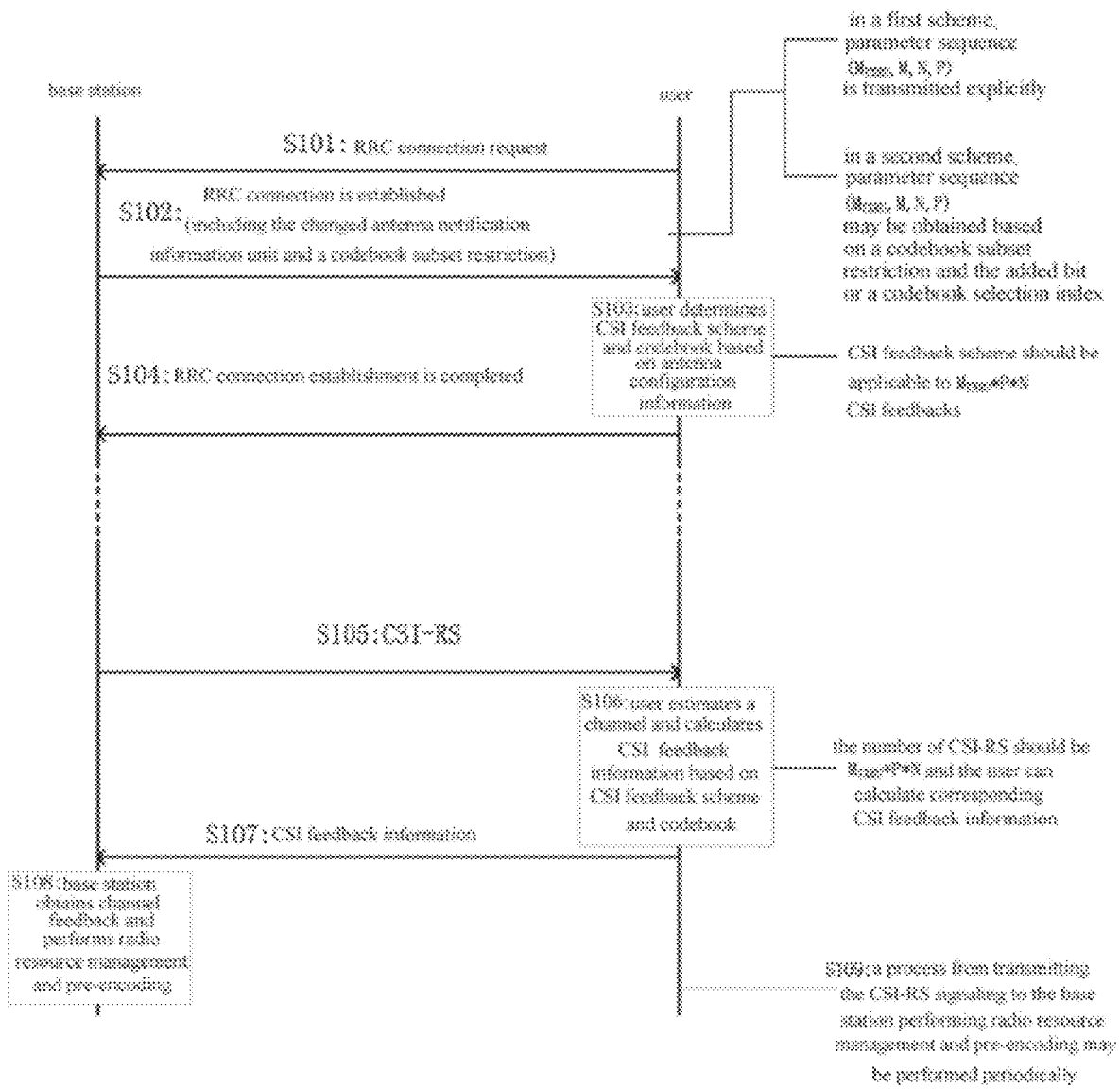
FIG. 8 is a sequence diagram illustrating a method for performing wireless communication in a wireless communication system according to an embodiment of the present disclosure.

Next, a signal interaction process between a base-station side and a user side in a wireless communication system according to an embodiment of the present disclosure is described in detail in conjunction with FIG. 8.

FIG. 8 is a sequence diagram of a method for performing wireless communication to in a wireless communication system according to an embodiment of the present disclosure.

As show in FIG. 8, in step S101, the user transmits an RRC connection request signaling to a base station to establish RRC connection.

In step S102, the base station transmits an RRC connection establishment signaling to the user, which includes an antenna notification information unit and a codebook subset restriction. The base station may select a first scheme or a second scheme to transmit the antenna configuration information during transmission. In the first scheme, the parameter sequence ($M_{TXRU}$, M, N, P) is transmitted explicitly. In the second scheme, the parameter sequence ($M_{TXRU}$, M, N, P) may be obtained based on the codebook subset restriction and the added bit or a codebook selection index.

In step S103, the user determines CSI feedback scheme and a codebook based on the antenna configuration information. The CSI feedback scheme should be applicable to $M_{TXRU} \times P \times N$ CSI feedbacks.

In step S104, the user transmits an RRC connection establishment complete signaling to the base station.

In step S105, the base station transmits CSI-RS to the user.

In step S106, the user estimates the channel and calculates CSI feedback information based on the CSI feedback scheme and the codebook. The number of CSI-RSs should be $M_{TXRU} \times P \times N$ and the user can calculate corresponding CSI feedback information.

In step S107, the user transmits the CSI feedback information to the base station.

In step S108, the base station obtains the channel feedback and performs radio resource management and pre-encoding.

Finally, in step S109, steps S105 to S108 are repeated. A process from transmitting the CSI-RS signaling to the base station performing radio resource management and pre-encoding may be performed periodically.

Next, an operation mode of the present disclosure is described in conjunction with an example in which the base-station antenna configurations are (1, 8, 4, 2) and (2, 4, 4, 1) and the base station transmits 8 CSI-RS by using 8 antenna ports in FIG. 9.

In a case of the antenna configuration being (1, 8, 4, 2), it is assumed that the antenna configuration is transmitted explicitly by using the first scheme. In AntennaInfoDedicated-r13, values corresponding to the antenna configuration parameters should be as follows: antennaNumberCountM=8, antennaNumberCountN=4, antennaNumberCountR=2, antennaNumberCouraMTXRU=1. The base station transmits the parameter values to the user so that the user can obtain that the antenna configuration of the base station is (1, 8, 4, 2), and the signalings are as follows.

```
... ...
    AntennaInfoDedicated-r13 ::=         SEQUENCE {
        antennaNumberCountM                      8
        antennaNumberCountN                      4
        antennaNumberCountP                      2
        antennaNumberConutMTXRU                  1
    }
```

Similarly, signaling being transmitted by the base station are as follows in a case that the antenna configuration is (2, 4, 4, 1).

```
... ...
    AntennaInfoDedicated-r13 ::=         SEQUENCE {
        antennaNumberCountM                      4
        antennaNumberCountN                      4
        antennaNumberCountP                      1
        antennaNumberConutMTXRU                  2
    }
```

Alternatively, the base station selects the second scheme to transmit the antenna configuration implicitly. The base station should select to transmit n8IXAMenna-tm11-r13 in codebooksubsetrestriction-v13xx since the number of the antenna ports of the base station is 8. Since the antenna configuration parameter is (8, 4, 2), based on Table 2, in a case of 8TXRU, the added bits should be 010 (or a codebook selection index is used, and in this case the index should be 011). Accordingly, the user can determine that the antenna parameter configuration is (8, 4, 21) based on the information. And the user has obtained that the number of the TXRUs of the base station is 8, and the user can know that an overall antenna configuration of the base station is (1, 8, 4, 2). The signaling are as follows.

```
AntennaInfoDedicated-r10 ::=      SEQUENCE {
    transmissionMode-r10              ENUMERATED {
                                          tm1, tm2, tm3, tm4, tm5, tm6, tm7, tm8-v1320,
                                          tm9-v1020, tm10-v1130, tm11-v13xx, spare5, spare4,
                                          spare3, spare2, spare1},
    codebookSubsetRestriction-r10     BIT STRING    OPTIONAL,-- Cond TMX
    ue-TransmitAntennaSelection       CHOICE{
        release                           NULL,
        setup                             ENUMERATED {closedLoop, openLoop}
    }
}
... ...
AntennaInfoDedicated-v13xx ::=    SEQUENCE {
    codebookSubsetRestriction-v13xx   CHOICE {
        n8TxAntenna-tm11-r13              BIT STRING (SIZE (112)),
    }   OPTIONAL                                                                 }
```

Similarly, the added bits should be 011 (or a codebook selection index is used, and in this case the index should be 110) in a case that the antenna configuration is (2, 4, 4, 1), the signaling being transmitted by the base station are as follows.

```
AntennaInfoDedicated-r10 ::=      SEQUENCE {
    transmissionMode-r10              ENUMERATED {
                                          tm1, tm2, tm3, tm4, tm5, tm6, tm7, tm8-v1320,
                                          tm9-v1020, tm10-v1130, tm11-v13xx, spare5, spare4,
                                          spare3, spare2, spare1},
    codebookSubsetRestriction-r10     BIT STRING    OPTIONAL,-- Cond TMX
    ue-TransmitAntennaSelection       CHOICE{
        release                           NULL,
        setup                             ENUMERATED {closedLoop, openLoop}
    }
}
... ...
AntennaInfoDedicated-v13xx ::=    SEQUENCE {
    codebookSubsetRestriction-v13xx   CHOICE {
        n8TxAntenna-tm11-r13              BIT STRING (SIZE (112)),
    }   OPTIONAL                                                                 }
```

The user selects a corresponding codebook to perform CSI feedback upon reception of such two antenna configurations of base station. In a case that the antenna configuration on a base-station side is (1, 8, 4, 2) for example, the user equipment determines that there are 8 TXRUs in a same horizontal direction, which is the same as the assumed antenna configuration of current Rel-12, and the user equipment selects to use a codebook of 8 antenna ports in TM10, that is $$codebook_{(1, 8, 4, 2)} = codebook_{8-tm10}$$

Correspondingly, the user equipment feeds back a code index being selected from the codebook (for example, PMI) to the base station. In a case that the antenna configuration on the base-station side is (2, 4, 4, 1), for example, the user equipment determines that there are two sets of TXRUs with different heights. Each set contains 4 TXRUs corresponding to 4 antenna ports, thus two sets of codebooks of 4 antenna ports are selected. Further, since two sets of TXRUs have offset phase due to height difference. The two sets of codebooks have relevance, for example, the user equipment takes a codebook of 4 antenna ports in TM 10 as a first set of codebook, and obtains a second set of codebook by adding oddest phase θ to a code in the codebook of 4 antenna ports in TM10, that is $$codebook_{(2,4,4,1)} = \begin{pmatrix} codebook_{4-tm10} \\ codebook_{4-tm10}e^{j\theta} \end{pmatrix}$$

correspondingly, the user equipment feeds back the code index being selected from the above codebook (for example, PMI) and the offset phase to the base station.

As can be seen that, the user selects different CSI feedback codebooks based on the antenna configuration on the base-station side in a case that antenna configurations especially TXRU configurations on the base-station side are different. Moreover, in the example, in a process of determining the CSI codebook feedback on a user side, the user actually uses two parameters of $M_{TXRU}$ and the number of ports on the base-station side. The base-station side only needs to transmit $M_{TXRU}$ and N×P signaling without independent information on M, N and P. Moreover, the base station can allow the user to determine a corresponding antenna codebook only by transmitting one of $M_{TXRU}$ and N×P since a total number of TXRUs on the base-station side can be determined based on the number of antenna ports. Hence, in practice, the base station should transmit all or a part of the transmission parameter sequence ($M_{TXRU}$, M, N, P) to the user, and signaling overhead of the system can be reduced.

In practice, the user transmits an RRC connection request signaling to the base station to establish RRC connection, and the base station transmits an RRC connection establishment signaling to the user, in which the base station can select the first scheme or the second scheme as above described to add related information on antenna configuration into the RRC connection establishment signaling. The user determines a scheme and a codebook for CST feedback based on the received antenna configuration information, then the user transmits an RRC connection establishment complete signaling to the base station. Thereafter, the base station transmits CSI-RS as shown in FIG. 9 to the user in a case that the base station needs to perform channel estimation. The user performs channel measurement upon reception of the CSI-RS, then determines CST feedback information based on the determined the scheme and the codebook for CSI feedback and transmits to the base station. The base station completes channel estimation after obtaining CST feedback, and performs a corresponding radio resource management and pre-encoding.

According to an embodiment of the present disclosure, in a new design of antenna configuration notification, the number of antennas and the number of the TXRUs on the base-station side are notified to the UE. Being inspired by the description of the number of antennas and the number of TXRUs in 2D antenna array, the parameter sequence ($M_{TXRU}$, M, N, P) is enough to notify all antenna configurations to the UE.

According to an embodiment of the present disclosure, the antenna configuration information is transmitted from the base station to the UE by using change in the antenna notification information unit and other related information unit, thereby optimizing CSI feedback mechanism in the 3D MIMO system, and improving transmission performance of 3D MIMO system.

According to an embodiment of the present disclosure, a user in the 3D MIMO system can determine antenna configuration of the base station. In the 3D MIMO system, an original notification unit used for 1D antenna array information is no longer applicable since a 2D antenna array is used. The antenna notification information unit is necessary in radio resource management. The two schemes according to the present disclosure are applicable to the antenna notification information unit in the 3D MIMO system.

According to an embodiment of the present disclosure, CSI feedback flow in the 3D MIMO system can be completed. Original CSI feedback flow is not applicable to the 3D MIMO system since a new perpendicular dimension is introduced into the 3D MIMO system, To implement CSI feedback flow in the 3D MIMO system, the user needs to determine antenna configuration on the base-station side, and an antenna notification mechanism designed according to the present disclosure can realize the objective, thereby completing CSI feedback flow in the 3D MIMO system.

According to an embodiment of the present disclosure, the antenna configuration notification scheme according to the present disclosure is a necessary part of the 3D MIMO system, thereby perfecting the 3D MIMO system.

According to an embodiment of the present disclosure, the schemes include explicit and implicit modes, and a relationship between antenna configuration parameters to be indicated is taken into full consideration. Hence, the scheme according to the present disclosure has better flexibility, low signaling overhead and small change in standard, and it is easy to extend to use the scheme according to the present disclosure in future different antenna number combinations.

The technology of the present disclosure can be applied to various products. For example, the base station mentioned in the present disclosure may be implemented as any type of an evolved node B (eNB), such as a macro eNB and a small eNB. The small eNB may be an eNB which covers a cell smaller than a macro cell, such as a pica eNB, a micro eNB and a home (femto) eNB. Alternatively, the base station may be implemented as any other type of a base station, such as a Node B and a base transceiver station (BTS). The base station may include: a main body (also referred to as a base station device) configured to control the wireless communication, and one or more remote radio header (RRH) provided at a different site from the main body. Further, various types of terminals may be served as a base station by performing the function of the base station temporarily or semi-permanently.

For example, the UE mentioned in the present disclosure may be implemented as a mobile terminal (such as an smart phone, a panel personal computer (PC), a notebook PC, a portable game terminal, a portable/dongle mobile router and a digital camera device) or an on-board terminal (such as a car navigation device). The UE may also be implemented as a terminal for performing machine to machine (M2M) communication, which is also referred to as a machine-type communication (MTC) terminal. Further, the UE may be a wireless communication module mounted on each of the above terminals (such as the integrated circuit module including a single chip).

Figure 10:
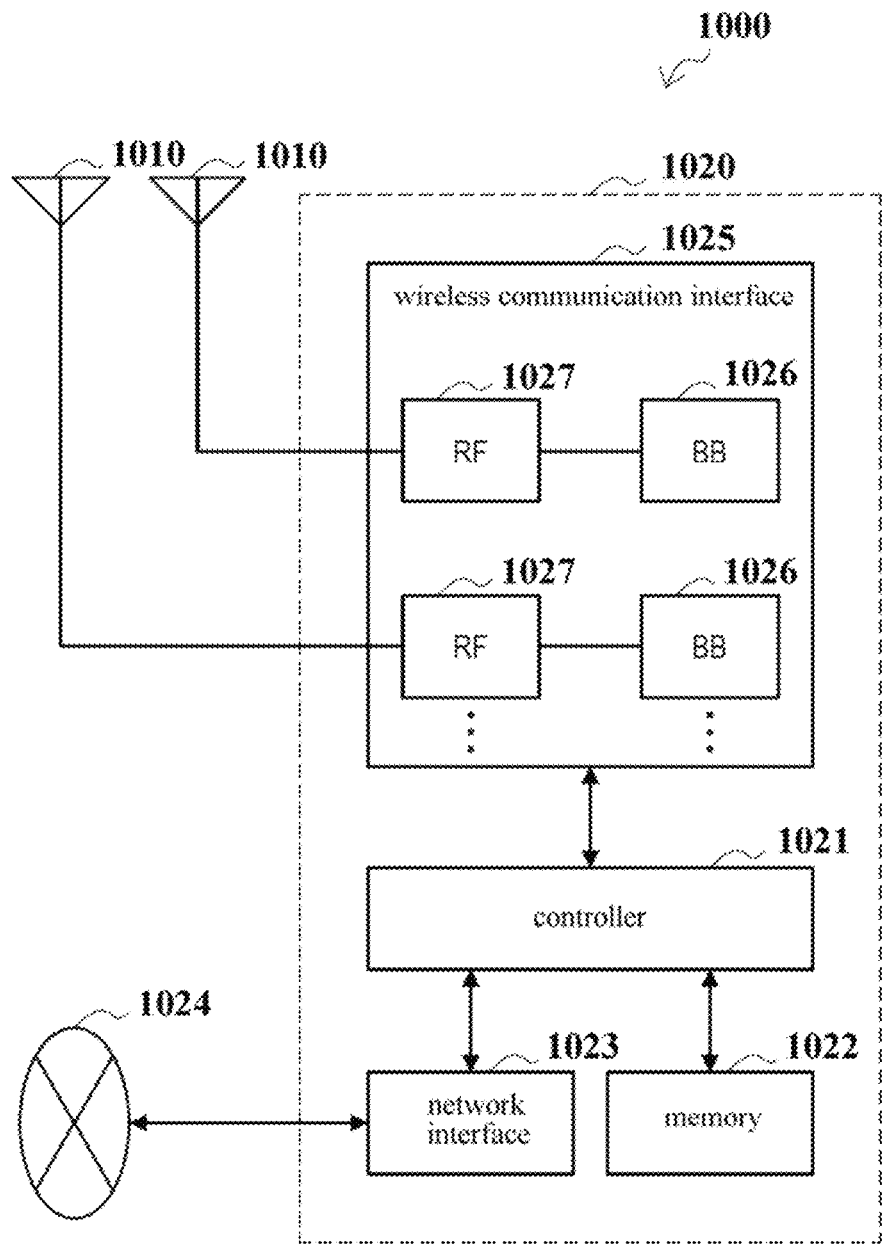
FIG. 10 is a block diagram illustrating a first example of a schematic configuration of an eNB (evolution Node Base Station) to which the present disclosure is applicable.

FIG. 10 is a block diagram illustrating a first example of a schematic configuration of an eNB to which the technology according to the present disclosure is applicable. An eNB 1000 includes one or more antennas 1010 and a base station device 1020. The base station device 1020 and each antenna 1010 may be connected with each other via RF cable.

Each of the antennas 1010 includes one or more antenna elements (such as the multiple antenna elements included in the multiple-input multiple-output (MIMO) antenna), and is used for transmitting and receiving the wireless signal by the base station device 1020. As show in FIG. 10, the eNB 1000 may include multiple antennas 1010. For example, the multiple antennas 1010 may be compatible with the multiple frequency bands used by the eNB 1000. The eNB 1000 may also include a single antenna 1010 although FIG. 10 shows an example of the eNB 1000 including multiple antennas 1010.

The base station device 1020 includes a controller 1021, a memory 1022, a network interface 1023 and a wireless communication interface 1025.

For example, the controller 1021 may be a CPU or DSP, and performs various functions of higher layers of the base station device 1020. For example, the controller 1021 generates a data packet based on the data in the signal processed by the wireless communication interface 1025, and transfers the generated packet via the network interface 1023. The controller 1021 may bundle data from multiple baseband processors to generate bundled packet, and transfers the generated bundled packet. The controller 1021 may have logical function to perform the control such as radio resource control, radio bearer control, mobility management, admission control and scheduling. The control may be performed in conjunction with the neighboring eNB or a core network node. The memory 1022 includes RAM and ROM, and stores the program to be performed by the controller 1021 and various types of control data (such as a terminal list, transmission power data and scheduling data).

The network interface 1023 is a communication interface for connecting the base station device 1020 to the core network 1024. The controller 1021 may communication with the core network node or another eNB via the network interface 1023. In this case, the eNB 1000 and the core network node or other eNB may be connected with each other via a logic interface (such as S1 interface and X2 interface). The network interface 1023 may also be a wired communication interface or a wireless communication interface for wireless backhaul routing. If the network interface 1023 is a wireless communication interface, the network interface 1023 may use a higher frequency band for wireless communication as compared with that used by the wireless communication interface 1025.

The wireless communication interface 1025 supports any cellular communication scheme (such as the long term evolution (LTE) and the LTE-Advanced), and provides a wireless connection to a terminal located in the cell of the eNB 1000 via the antenna 1010. The wireless communication interface 1025 may generally include for example a base band (BB) processor 1026 and a RF circuit 1027. The BB processor 1026 may perform for example encoding/decoding, modulation/demodulation and multiplexing/demultiplexing, and performs various types of signal processes of the layer (for example L1, media access control (MAC), radio link control (RLC) and packet data convergence protocol (PDCP)), instead of the controller 1021, the BB processor 1026 may have some or all of the above logical functions, The 1313 processor 1026 may be a memory storing the communication control program, or a module including a processor and related circuit configured to perform the program. The updating program may change the function of the BB processor 1026. The module may be a card or blade inserted into the slot of the base station device 1020. Alternatively, the module may be a chip mounted on the card or the blade. The RF circuit 1027 may include for example a mixer, a filter and an amplifier, and transmit and receive the wireless signal via the antenna 1010.

As shown in FIG. 10, the wireless communication interface 1025 may include multiple BB processors 1026. For example, the multiple BB processors 1026 may be compatible with the multiple frequency bands used by the eNB 1000. As shown in FIG. 10, the wireless communication interface 1025 may include multiple RF circuits 1027. For example, the multiple RF circuits 1027 may be compatible with multiple antenna elements. Although an example in which the wireless communication interface 1025 includes multiple 1313 processors 1026 and multiple RF circuits 1027 is shown in FIG. 10, the wireless communication interface 1025 may include a single BB processor 1026 and a single RF circuit 1027.

Figure 11:
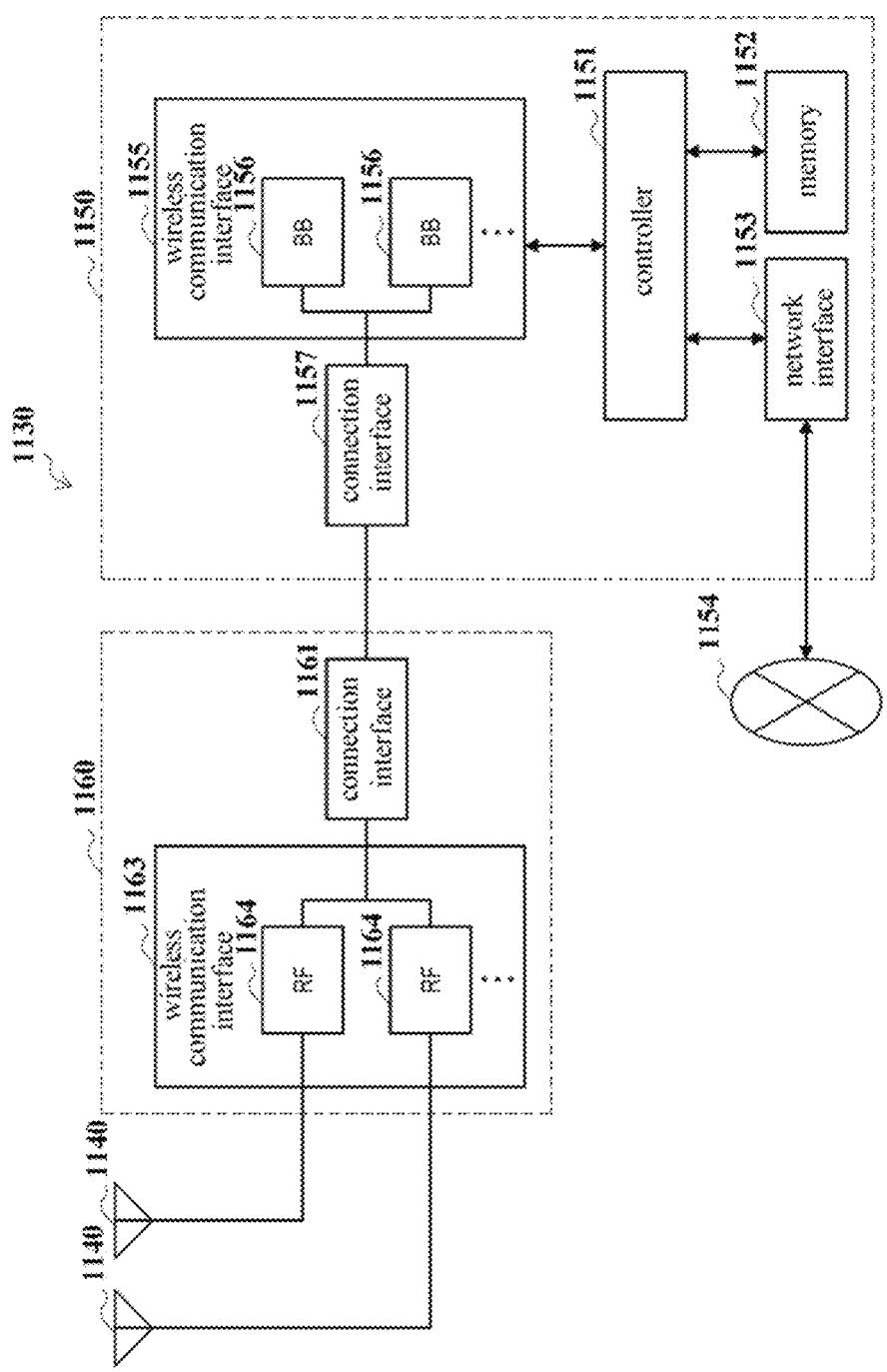
FIG. 11 is a block diagram illustrating a second example of a schematic configuration of an eNB to which the present disclosure is applicable.

FIG. 11 is a block diagram illustrating a second example of a schematic configuration of an eNB to which the technology according to the disclosure is applicable. An eNB 1130 includes one or more antennas 1140, a base station device 1150 and a RRH 1160. The RRH 1160 and each antenna 1140 may be connected with each other via RF cable. The base station device 1150 and the RRH 1160 may be connected with each other via a high-speed line such as optical fiber.

Each of the antennas 1140 includes one or more antenna element (such as the multiple antenna elements included in the MIMO antenna), and is used for transmitting and receiving the wireless signal by the RRH 1160. As show in FIG. 11, the eNB 1130 may include multiple antennas 1140. For example, the multiple antennas 1140 may be compatible with the multiple frequency bands used by the eNB 1130. The eNB 1130 may also include a single antenna 1140 although FIG. 11 shows an example of the eNB 1130 including multiple antennas 1140.

The base station device 1150 includes a controller 1151, a memory 1152, a network interface 1153, a wireless communication interface 1155 and a connection interface 1157. The controller 1151, the memory 1152 and the network interface 1153 are the same as the controller 1021, the memory 1022 and the network interface 1023 as described in FIG. 10.

The wireless communication interface 1155 supports any cellular communication scheme (such as LTE and LTE-Advanced), and provides wireless communication to a terminal positioned in a sector corresponding to the RRH 1160 via the RRH 1160 and the antenna 1140. The wireless communication interface 1155 may typically include, for example, a BB processor 1156. The BB processor 1156 is the same as the BB processor 1026 described with reference to FIG. 10, except that the BB processor 1156 is connected to the RF circuit 1164 of the RRH 1160 via the connection interface 1157. The wireless communication interface 1155 may include the multiple BB processors 1156, as illustrated in FIG. 11. For example, the multiple BB processors 1156 may be compatible with multiple frequency bands used by the eNB 1130. Although FIG. 11 illustrates the example in which the wireless communication interface 1155 includes the multiple BB processors 1156, the wireless communication interface 1155 may also include a single BB processor 1156.

The connection interface 1157 is an interface for connecting the base station device 1150 (wireless communication interface 1155) to the RRH 1160. The connection interface 1157 may also be a communication module for communication in the above-described high speed line that connects the base station device 1150 (wireless communication interface 1155) to the RRH 1160.

The RRH 1160 includes a connection interface 1161 and a wireless communication interface 1163.

The connection interface 1161 is an interface for connecting the RRH 1160 (wireless communication interface 1163) to the base station device 1150. The connection interface 1161 may also be a communication module for communication in the above-described high speed line.

The wireless communication interface 1163 transmits and receives wireless signals via the antenna 1140. The wireless communication interface 1163 may typically include, for example, the RF circuit 1164. The RF circuit 1164 may include, for example, a mixer, a filter, and an amplifier, and transmits and receives wireless signals via the antenna 1140. The wireless communication interface 1163 may include multiple RF circuits 1164, as illustrated in FIG. 11. For example, the multiple RF circuits 1164 may support multiple antenna elements. Although FIG. 11 illustrates the example in which the wireless communication interface 1163 includes the multiple RF circuits 1164, the wireless communication interface 1163 may also include a single RF circuit 1164.

In the eNB 1000 and the eNB 1130 illustrated in FIGS. 10 and 11, the communication unit 430 described by using FIG. 4 may be implemented by the wireless communication interface 1025 and/or the wireless communication interface 1155 and/or the wireless communication interface 1163. At least a part of the functions may also be implemented by the controller 1021 and the controller 1151.

Figure 12:
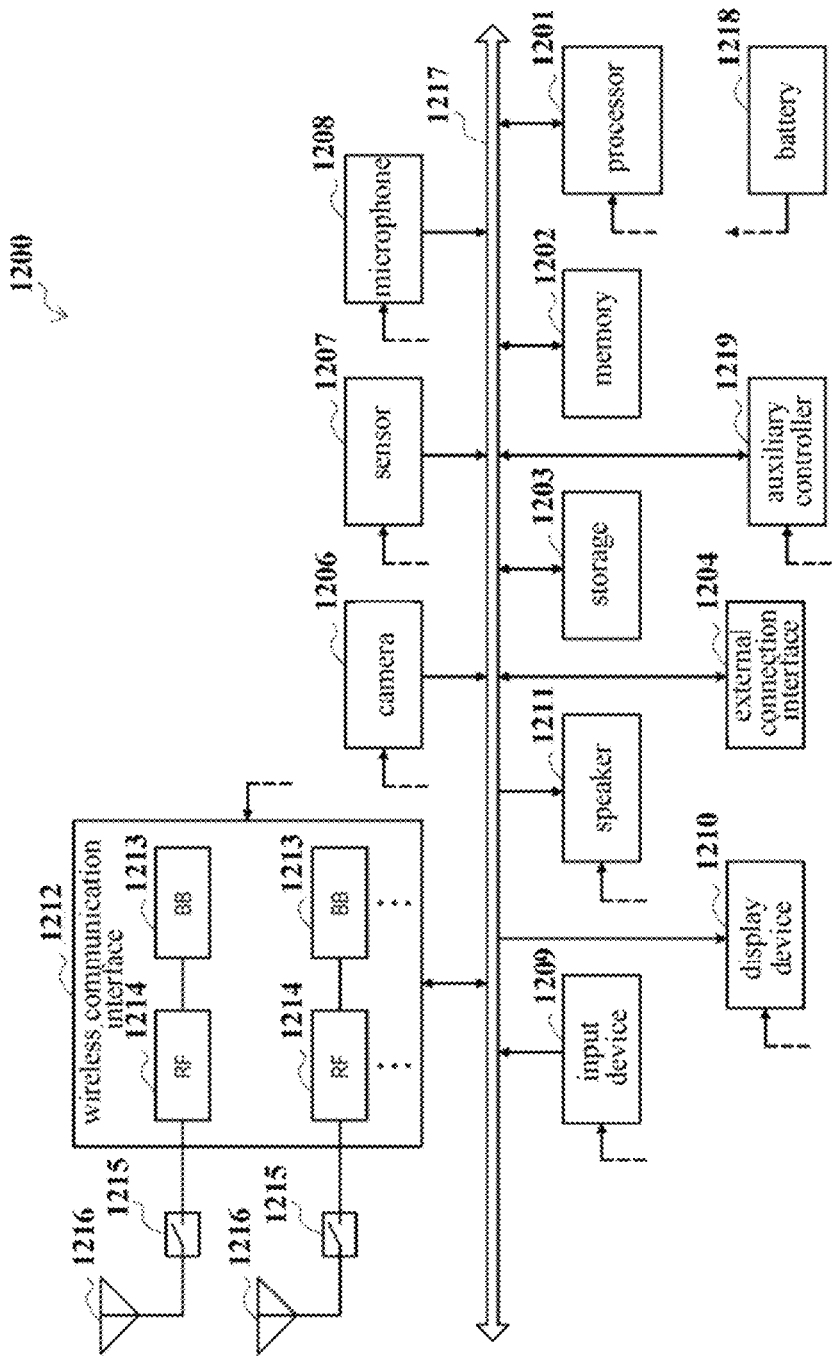
FIG. 12 is a block diagram illustrating an example of a schematic configuration of a smartphone to which the present disclosure is applicable.

FIG. 12 is a block diagram illustrating an example of a schematic configuration of a smartphone 1200 to which the technology according to the present disclosure is applicable. The smartphone 1200 includes a processor 1201, a memory 1202, a storage 1203, an external connection interface 1204, a camera 1206, a sensor 1207, a microphone 1208, an input device 1209, a display device 1210, a speaker 1211, a wireless communication interface 1212, one or more antenna switches 1215, one or more antennas 1216, a bus 1217, a battery 1218, and an auxiliary controller 1219.

The processor 1201 may be, for example, a CPU or a system on a chip (SoC), and controls functions of an application layer and another layer of the smartphone 1200. The memory 1202 includes RAM and ROM, and stores a program that is executed by the processor 1201 and data The storage 1203 may include a storage medium such as a semiconductor memory and a hard disk. The external connection interface 1204 is an interface for connecting an external device (such as a memory card and a universal serial bus (USB) device) to the smartphone 1200.

The camera 1206 includes an image sensor (such as a charge coupled device (CCD) and a complementary metal oxide semiconductor (CMOS)), and generates a captured image. The sensor 1207 may include a group of sensors such as a measurement sensor, a gyro sensor, a geomagnetic sensor, and an acceleration sensor. The microphone 1208 converts sounds that are inputted to the smartphone 1200 to audio signals. The input device 1209 includes, for example, a touch sensor configured to detect touch on a screen of the display device 1210, a keypad, a keyboard, a button, or a switch, and receives an operation or an information inputted from a user. The display device 1210 includes a screen (such as a liquid crystal display (LCD) and an organic light-emitting diode (OLED) display), and displays an output image of the smartphone 1200. The speaker 1211 converts audio signals that are outputted from the smartphone 1200 to sounds.

The wireless communication interface 1212 supports any cellular communication scheme (such as LET and LTE-Advanced), and performs wireless communication. The wireless communication interface 1212 may typically include, for example, a BB processor 1213 and an RF circuit 1214. The BB processor 1213 may perform, for example, encoding/decoding, modulating/demodulating, and multiplexing/demultiplexing, and performs various types of signal processing for wireless communication. Meanwhile, the RF circuit 1214 may include, for example, a mixer, a filter, and an amplifier, and transmits and receives wireless signals via the antenna 1216. The wireless communication interface 1212 may be a chip module having the BB processor 1213 and the RF circuit 1214 integrated thereon. The wireless communication interface 1212 may include multiple BB processors 1213 and multiple RF circuits 1214, as illustrated in FIG. 12. Although FIG. 12 illustrates the example in which the wireless communication interface 1212 includes the multiple BB processors 1213 and the multiple RF circuits 1214, the wireless communication interface 1212 may also include a single BB processor 1213 or a single RF circuit 1214.

Furthermore, in addition to a cellular communication scheme, the wireless communication interface 1212 may support another type of wireless communication scheme such as a short-distance wireless communication scheme, a near field communication scheme, and a radio local area network (LAN) scheme. In that case, the wireless communication interface 1212 may include the BB processor 1213 and the RF circuit 1214 for each wireless communication scheme.

Each of the antenna switches 1215 switches connection destinations of the antennas 1216 among multiple circuits (such as circuits for different wireless communication schemes) included in the wireless communication interface 1212.

Each of the antennas 1216 includes a single or multiple antenna elements (such as multiple antenna elements included in an MIMO antenna), and is used for the wireless communication interface 1212 to transmit and receive wireless signals. The smartphone 1200 may include the multiple antennas 1216, as illustrated in FIG. 12. Although FIG. 12 illustrates the example in which the smartphone 1200 includes the multiple antennas 1216, the smartphone 1200 may also include a single antenna 1216.

Furthermore, the smartphone 1200 may include the antenna 1216 for each wireless communication scheme. In that case, the antenna switches 1215 may be omitted from the configuration of the smartphone 1200.

The bus 1217 connects the processor 1201, the memory 1202, the storage 1203, the external connection interface 1204, the camera 1206, the sensor 1207, the microphone 1208, the input device 1209, the display device 1210, the speaker 1211, the wireless communication interface 1212, and the auxiliary controller 1219 to each other. The battery 1218 supplies power to blocks of the smartphone 1200 illustrated in FIG. 12 via feeder lines, which are partially shown as dashed lines in the drawing. The auxiliary controller 1219 operates a minimum necessary function of the smartphone 1200, for example, in a sleep mode.

In the smartphone 1200 illustrated in FIG. 12, the communication unit 720 described by using FIG. 7 may be implemented by the wireless communication interface 1212. At least a part of the functions may also be implemented by the processor 1201 or the auxiliary controller 1219.

Figure 13:
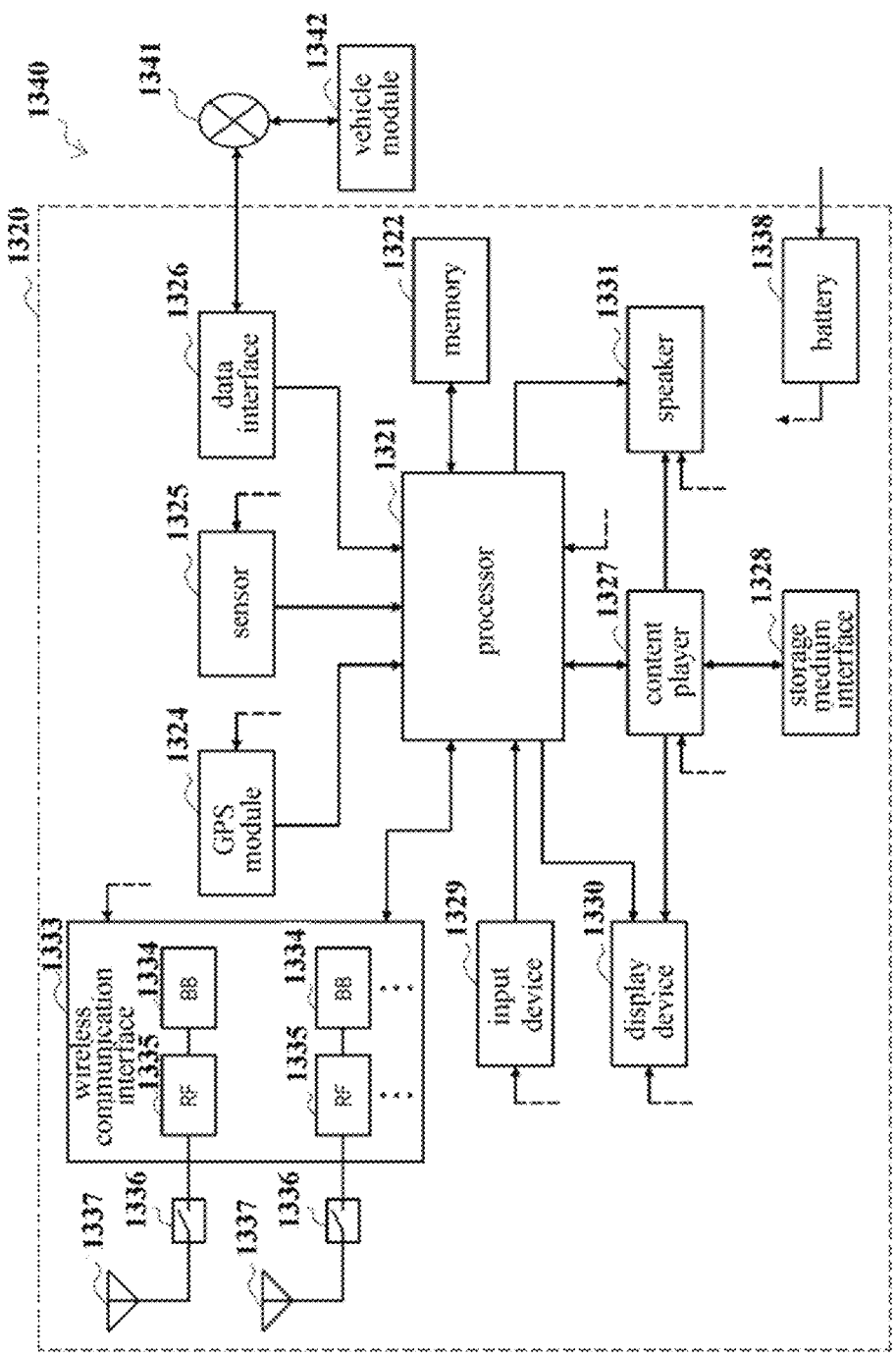
FIG. 13 is a block diagram illustrating an example of a schematic configuration of a car navigation device to which the present disclosure is applicable.

FIG. 13 is a block diagram illustrating an example of a schematic configuration of a car navigation device 1320 to which the technology according to the present disclosure is applicable. The car navigation device 1320 includes a processor 1321, a memory 1322, a global positioning system (GPS) module 1324, a sensor 1325, a data interface 1326, a content player 1327, a storage medium interface 1328, an input device 1329, a display device 1330, a speaker 1331, a wireless communication interface 1333, one or more antenna switches 1336, one or more antennas 1337, and a battery 1338.

The processor 1321 may be, for example, a CPU or a SoC, and controls a navigation function and another function of the car navigation device 1320. The memory 1322 includes RAM and ROM, and stores a program that is executed by the processor 1321, and data.

The GPS module 1324 uses GPS signals received from a GPS satellite to measure a position (such as latitude, longitude, and altitude) of the car navigation device 1320. The sensor 1325 may include a group of sensors such as a gyro sensor, a geomagnetic sensor, and an air pressure sensor. The data interface 1326 is connected to, for example, an in-vehicle network 1341 via a terminal that is not shown, and acquires data generated by the vehicle, such as vehicle speed data.

The content player 1327 reproduces content stored in a storage medium (such as a CD and a DVD) that is inserted into the storage medium interface 1328. The input device 1329 includes, for example, a touch sensor configured to detect touch on a screen of the display device 1330, a button, or a switch, and receives an operation or an information inputted from a user. The display device 1330 includes a screen such as a LCD or an MED display, and displays an image of the navigation function or content that is reproduced. The speaker 1331 outputs sounds of the navigation function or the content that is reproduced.

The wireless communication interface 1333 supports any cellular communication scheme (such as LTE and LTE-Advanced), and performs wireless communication. The wireless communication interface 1333 may typically include, for example, a BB processor 1334 and an RF circuit 1335. The BB processor 1334 may perform, for example, encoding/decoding, modulating/demodulating, and multiplexing/demultiplexing, and performs various types of signal processing for wireless communication. Meanwhile, the RF circuit 1335 may include, for example, a mixer, a filter, and an amplifier, and transmits and receives wireless signals via the antenna 1337. The wireless communication interface 1333 may also be one chip module that has the BB processor 1334 and the RF circuit 1335 integrated thereon. The wireless communication interface 1333 may include multiple BB processors 1334 and multiple RF circuits 1335, as illustrated in FIG. 13. Although FIG. 13 illustrates the example in which the wireless communication interface 1333 includes the multiple BB processors 1334 and the multiple RF circuits 1335, the wireless communication interface 1333 may also include a single BB processor 1334 or a single RF circuit 1335.

Furthermore, in addition to a cellular communication scheme, the wireless communication interface 1333 may support another type of wireless communication scheme such as a short-distance wireless communication scheme, a near field communication scheme, and a wireless LAN scheme. In that case, the wireless communication interface 1333 may include the BB processor 1334 and the RE circuit 1335 for each wireless communication scheme.

Each of the antenna switches 1336 switches connection destinations of the antennas 1337 among multiple circuits (such as circuits for different wireless communication schemes) included in the wireless communication interface 1333.

Each of the antennas 1337 includes a single or multiple antenna elements (such as multiple antenna elements included in an MIMO antenna), and is used for the wireless communication interface 1333 to transmit and receive wireless signals. The car navigation device 1320 may include multiple antennas 1337, as illustrated in FIG. 13. Although FIG. 13 illustrates the example in which the car navigation device 1320 includes the multiple antennas 1337, the car navigation device 1320 may also include a single antenna 1337.

Furthermore, the car navigation device 1320 may include the antenna 1337 for each wireless communication scheme. In that case, the antenna switches 1336 may be omitted from the configuration of the car navigation device 1320.

The battery 1338 supplies power to blocks of the car navigation device 1320 illustrated in FIG. 13 via feeder lines that are partially shown as dashed lines in the drawing. The battery 1338 accumulates power supplied form the vehicle.

In the car navigation device 1320 illustrated in FIG. 13, the communication unit 720 described by using FIG. 7 may be implemented by the wireless communication interface 1333. At least a part of the functions may also be implemented by the processor 1321.

The technology of the present disclosure may also be realized as an in-vehicle system (or a vehicle) 1340 including one or more blocks of the car navigation device 1320, the in-vehicle network 1341, and a vehicle module 1342. The vehicle module 1342 generates vehicle data (such as vehicle speed, engine speed, and trouble information), and outputs the generated data to the in-vehicle network 1341.

In the system and method of the present disclosure, it will be apparent that the components or steps may be decomposed and/or recombined. These decomposition and/or recombination shall be considered as equivalent to the present disclosure. Also, the steps of executing the above-described series of processes can be naturally performed in chronological order in the described order, but need not necessarily be performed in chronological order. Some steps may be performed in parallel or independently from each other.

While the embodiments of the present disclosure have been described in detail with reference to the accompanying drawings, it is to be understood that the above-described embodiments are merely illustrative of the present disclosure and are not to be construed as limiting the present disclosure. It will be apparent to those skilled in the art that various modifications and variations can be made in the above-described embodiments without departing from the spirit and scope of the present disclosure. Accordingly, the scope of the disclosure is to be limited only by the appended claims and their equivalents.

The invention claimed is:

1. An electronic device in a wireless communication system, comprising circuitry configured to:
   receive an RRC signaling comprising antenna configuration information;
   determine a PMI based on the antenna configuration information, wherein the PMI is applicable to an antenna array of a base station comprising a plurality of antenna units which are in M rows and N columns and have a P-dimension polarization direction, wherein M, N and P are natural numbers;
   transmit feedback information comprising the PMI, wherein the antenna configuration information comprises a codebook subset restriction that indicates a number of TXRU.

2. The electronic device according to claim 1, wherein the antenna configuration information comprises a number of TXRU of the plurality of antenna units, wherein each TXRU is related to a group of antenna units having a same polarization direction, the circuitry is further configured to determine the PMI based on the number of TXRU of the plurality of antenna units.

3. The electronic device according to claim 1, wherein the circuitry is further configured to determine the PMI based on the codebook subset restriction.

4. The electronic device according to claim 1, wherein the parameter P is provided in the antenna configuration information.

5. The electronic device according to claim 1, wherein a parameter $M_{TXRU}$ is provided in the antenna configuration information and indicates a number of TXRUs in each dimension of the polarization direction of each column in the antenna array.

6. The electronic device according to claim 1, wherein the circuitry is further configured to determine a CSI feedback scheme based on the antenna configuration information, wherein the feedback information comprises CSI feedback information.

7. An electronic device in a wireless communication system, comprising circuitry configured to:
   determine antenna configuration information for an antenna array in the electronic device comprising a plurality of antenna units which are in M rows and N columns and have a P-dimension polarization direction, wherein M, N and P are natural numbers;
   transmit, to a user-side device, an RRC signaling comprising the antenna configuration information;
   receive feedback information from the user-side device, wherein the antenna configuration information comprises a codebook subset restriction that indicates a number of TXRU.

8. The electronic device according to claim 7, wherein the parameter P is provided in the antenna configuration information.

9. The electronic device according to claim 7, wherein a parameter $M_{TXRU}$ is provided in the antenna configuration information and indicates a number of TXRUs in each dimension of the polarization direction of each column in the antenna array.

10. A method of communication in a wireless communication system, comprising:
    receiving an RRC signaling comprising antenna configuration information;
    determining a PMI based on the antenna configuration information, wherein the CSI feedback scheme is applicable to an antenna array of a base station comprising a plurality of antenna units which are in M rows and N columns and have a P-dimension polarization direction, wherein M, N and P are natural numbers; and
    transmitting feedback information comprising the PMI, wherein the antenna configuration information comprises a codebook subset restriction that indicates a number of TXRU.

11. The method of communication according to claim 10, wherein the method further comprises determining the PMI based on the codebook subset restriction.

12. The method of communication according to claim 11 wherein the parameters M, N and P are obtained from the codebook subset restriction.

13. The method of communication according to claim 10, wherein the parameters M, N and P are provided in the antenna configuration information.

14. The method of communication according to claim 10, wherein a parameter $M_{TXRU}$ is provided in the antenna configuration information and indicates the number of TXRUs in each dimension of the polarization direction of each column in the antenna array.

15. The method of communication according to claim 10, wherein the antenna configuration information comprises a number of TXRU of the plurality of antenna units, wherein each TXRU is related to a group of antenna units having a same polarization direction, the method further comprises determining the PMI based on the number of TXRU of the plurality of antenna units.

16. A method of communication in a wireless communication system, comprising:
    determining antenna configuration information for an antenna array of a base station comprising a plurality of antenna units which are in M rows and N columns and have a P-dimension polarization direction, wherein M, N and P are natural numbers;
    transmitting, to a user-side device, an RRC signaling comprising the antenna configuration information;
    receiving feedback information from the user-side device, wherein the antenna configuration information comprises a codebook subset restriction that indicates a number of TXRU.

17. The method of communication according to claim 16, wherein the codebook subset restriction identifies the parameters M, N and P.

18. The method of communication according to claim 16, wherein the parameters M, N and P are provided in the antenna configuration information.

19. The method of communication according to claim 16, wherein a parameter $M_{TXRU}$ is provided in the antenna configuration information and indicates the number of TXRUs in each dimension of the polarization direction of each column in the antenna array.

* * * * *